United States Patent Office 3,374,275
Patented Mar. 19, 1968

3,374,275
STABILIZATION OF POLYOXYALKYLENE
COMPOUNDS
Charles R. Dickey, Covina, Calif., assignor to Union
Carbide Corporation, a corporation of New York
No Drawing. Continuation-in-part of application Ser. No.
216,960, Aug. 15, 1962. This application May 24, 1966,
Ser. No. 552,421
7 Claims. (Cl. 260—611.5)

This application is a continuation-in-part of U.S. application Ser. No. 216,960, filed Aug. 15, 1962 and now abandoned.

This invention relates to polyoxyalkylene compounds. In one aspect the invention is directed to stabilized polyoxyalkylene compounds.

Polyoxyalkylene compounds, in general, are well known. Such compounds are widely used as synthetic lubricants, hydraulic fluids, detergents, and plasticizers. These compounds, however, are highly susceptible to oxidation, particularly at elevated temperatures. Ultimately the oxidative decomposition results in a substantial decrease in the average molecular weight of the polymer. Early attempts to prevent decomposition and to combat the corrosive effects of the decomposition products consisted of buffering with alkaline salts, the use of amines to adjust pH, and the use of antioxidants. While these methods are of some value they are not sufficiently effective to satisfy the needs of the art. Many of the stabilizers now in use do not provide a long-term protection and oftentimes fail to stabilize the polyoxyalkylene compound for more than a few hours. Furthermore, many of these stabilizers are objectionable in that relatively large quantities, e.g., from 1 to 2.5 weight percent, are required.

Accordingly, it is an object of this invention to provide novel stabilized polyoxyalkylene compounds. A further object is to provide a novel process for stabilizing polyoxyalkylene compounds. A still further object is to prevent molecular degradation of polyoxyalkylene compounds, by incorporating therein a stabilizing amount of a stabilizer described hereinafter.

The present invention is based upon the discovery that superior stabilization of polyoxyalkylene compounds can be achieved through the use of an admixture of phenothiazine or alkylphenothiazine and certain boron-containing compounds as stabilizing agents therefor.

The term "polyoxyalkylene compound(s)," as used herein including the appended claims, is meant a polymeric compound which contains the recurring oxyalkylene unit, i.e.,

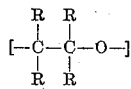

wherein each R, individually, can be hydrogen or alkyl, preferably hydrogen or lower alkyl, e.g., methyl, ethyl, propyl, butyl, and the like. The polymers may be homopolymers, random copolymers, or block-copolymers. Said polyoxyalkylene compounds are further characterized in that they are composed of carbon, hydrogen, and oxygen atoms, and have an average molecular weight ranging from about 200 to about 50,000, and higher, and preferably from about 300 to about 30,000.

While the present invention concerns the stabilization of polyoxyalkylene compounds as a class, it is particularly adaptable to the stabilization of polyoxyalkylene compounds which have an average molecular weight in excess of about 200 and which contain oxyethylene and/or oxypropylene groups.

Among the polyoxyalkylene compounds which are contemplated include, for instance, the polyoxyalkylene glycols, e.g., the polyoxyethylene glycols, polyoxypropylene glycols, the polyoxybutylene glycols, and the like; the copolymers of alkylene oxides, e.g., the polyoxyethylene-polyoxypropylene glycols, polyoxyethylenepolyoxybutylene glycols, and the like; the polyethers obtained by the reaction of one or more alkylene oxides, e.g., ethylene oxide, propylene oxide, butylene oxide and the like, in the presence of well known polymerization catalysts; the monoalkyl ethers of polyoxyalkylene glycols obtained by the reaction of one or more alkylene oxides and/or alkylene glycols with an alkanol; the dialkyl ethers of polyoxyalkylene glycols obtained by the etherification of the hydroxyl groups of polyoxyalkylene glycols, or the monoalkyl ethers thereof, by means well known to the art.

The stabilizer of the present invention comprises a boron-containing compound and a heterocyclic organic compound selected from the group consisting of phenothiazine and alkylphenothiazine.

Phenothiazine is known to be a satisfactory stabilizer for polyoxyalkylene compounds. Unexpectedly, the combination of phenothiazine or an alkylphenothiazine and certain boron containing compounds has been found to be several times more effective than either of the components used individually. Illustrative alkylphenothiazines are those wherein the alkyl group contains from 1 to 8 carbon atoms and include, for example, the lower alkyl substituted phenothiazines such as 1-methylphenothiazine, 2-isopropylphenothiazine, 1,9-diethylphenothiazine, and the like.

The boron containing compounds contemplated by the invention include the alkali metal borohydrides e.g., sodium borohydride, potassium borohydride, lithium borohydride, and the like; the amine boranes such as pyridine borane; the dialkylamine boranes and the trialkylamine boranes, e.g., dimethylamine borane, trimethylamine borane, dihexylamine borane, diisodecylamine borane, and the like. Preferred dialkylamine boranes and trialkylamine boranes are those containing alkyl groups having up to 8 carbon atoms.

Preferred boron-containing compounds are the alkali metal borohydrides, particularly sodium borohydride, potassium borohydride, and lithium borohydride.

The components of the stabilizer are employed in a stabilizing amount, i.e., an amount sufficient to substantially prevent molecular degradation. The optimum amount which is necessary will depend, to a significant extent, on the correlation of various factors, e.g., the nature of the polyoxyalkylene compound, the choice of the stabilizer components, the storage conditions, temperature, future use of the polyoxyalkylene compound, and the like. Those familiar with techniques of stabilization can easily determine the optimum quantity of stabilizer required under the particular circumstances.

In general, it has been observed that satisfactory stabilization is obtained when from about 0.005 weight percent to about 1.0 weight percent of each component of the stabilizer is incorporated into the polyoxyalkylene compound. The amount of each component is calculated with respect to the total weight of polyoxyalkylene compound to be stabilized.

The stabilizer components may be added individually or as an admixture to the polyoxyalkylene compound per se or in an inert, normally-liquid organic vehicle. Illustrative vehicles include benzene, toluene, xylene, and other solvents capable of acting as a solvent for the polyoxyalkylene compounds. The temperature at which the addition is carried out is not a narrowly critical factor. Agitation may conveniently be used to effect an intimate admixture. Those skilled in the art are well aware of the various techniques of introducing stabilizers.

In a preferred embodiment the stabilizer is added during or shortly before the polyoxyalkylene compound is refined. Refining of polyoxyalkylene compounds is the technique of neutralizing the residual alkaline catalyst which is employed in the alkylene oxide condensation reaction. Neutralization of the catalyst can be accomplished by contacting the unrefined polyoxyalkylene compound with, for example, a synthetic finely divided magnesium silicate powder. Alternatively, the neutralization can be effected by contacting the unrefined polyoxyalkylene compound with mineral acids such as sulfuric acid, hydrochloric acid, phosphoric acid, and the like; or through the use of an acidic ion exchange resin, or by other convenient means known in the art.

In general, superior results are obtained when there is no significant time lapse between neutralization of the alkaline catalyst and the addition of the stabilizer. The boron-containing component is preferably added to the polyoxyalkylene compound at the same time as the neutralizing agent, e.g., magnesium silicate. The resulting admixture then is agitated until the alkaline catalyst is substantially neutralized, at which point the phenothiazine component is added to the admixture. The point at which there is substantially complete neutralization of the alkaline catalyst is determined by drawing periodic samples of the admixtures containing the polyoxyalkylene compound, neutralizing agent, and the boron-containing compound, and then adding sufficient water to form a 10 percent by weight aqueous solution or dispersion and measuring the pH thereof. The phenothiazine component is added when the pH of the 10 percent solution is found to be 7 or below. The agitation is continued for a period of time sufficient to achieve the desired stabilization, generally from 2 and 3 hours.

The following examples will serve to illustrate the practice and the principles of the present invention.

*Examples 1 to 10*

Samples of monobutyl ether of a mixed oxyethylene-oxypropylene polyglycol having an average molecular weight of about 700, obtained by condensing equal parts by weight of ethylene oxide and propylene oxide with butanol, were heated to about 90° C., under an atmosphere of nitrogen. To each sample there was added about 1.5 weight percent of magnesium silicate, based on the weight of the sample, and an amount of a boron-containing compound as indicated in Table I. The resulting mixtures were stirred at uniform speed and the temperature maintained at 90° C. Periodically small portions of each sample were withdrawn and diluted with sufficient water to make a 10 percent by weight solution or dispersion. When the pH of this solution or dispersion was 7 or lower the phenothiazene was added to the mixture in the quantities indicated in Table I. When only one stabilizer component was used, i.e., Examples 1, 2, 3, 9 and 10, that component was added after the polyoxyalkylene compound and the magnesium silicate had been mixed together under uniform agitation for a period of 15 minutes. The mixture containing the polyoxyalkylene compound, magnesium silicate, and one or both of the stabilizer components was stirred for a period of 3 hours, after which any volatile materials were removed by distillation under a reduced pressure of 5 millimeters of mercury at 90° C., and then the residue filtered to remove the magnesium silicate.

The stabilized samples of polyoxyalkylene compound were then exposed to the atmosphere at 90° C. under uniform agitation. At intervals small portions of the stabilized polyoxyalkylene compounds were drawn off and diluted with sufficient water to give a 10 weight percent aqueous solution. When the pH of this 10 percent solution was found to be less than 5.5, the polyoxyalkylene compound was considered as degraded. The pertinent data is summarized in Table I.

That the combination of phenothiazine and a boron containing compound exerts a synergistic effect is readily apparent from an examination of the data contained in Table I. Examples 1 to 4 illustrate the substantially greater effectiveness of phenothiazine and sodium borohydride than the additive effects of each component individually. Examples 5 to 10, which involved the stabilization of a different batch of the polyoxyalkylene compound and differed from that used in connection with Examples 1 to 4 in respect to its contained impurities, illustrate the wide range of boron-containing compounds which can be used in conjunction with phenothiazine to obtain a degree of stabilization comparable to that of phenothiazine and sodium borohydride.

TABLE I

| Example Numbers | Inhibitor System | Concentration [1] | Hours to final pH | Hours to pH 5.5 | pH Start | pH Finish |
|---|---|---|---|---|---|---|
|  | Control [2] | 0.0 | 190 | 1.5 | 5.8 | 3.0 |
| 1 | Phenothiazine | 0.005 | 262 | 232 | 6.4 | 3.6 |
| 2 | do | 0.01 | 262 | 142 | 6.6 | 3.0 |
| 3 | Sodium Borohydride | 0.01 | 24 | 3 | 6.6 | 3.3 |
| 4 | {Phenothiazine / Sodium Borohydride} | 0.005 / 0.005 | 503 | 485 | 6.6 | 3.8 |
|  | Control [2] | 0.0 | 6.25 | 2 | 6.8 | 3.8 |
| 5 | {Phenothiazine / Sodium Borohydride} | 0.005 / 0.005 | 126.5 | 106 | 6.4 | 3.8 |
| 6 | {Phenothiazine / Potassium Borohydride} | 0.005 / 0.005 | 132 | 106 | 6.8 | 3.8 |
| 7 | {Phenothiazine / Diamethylamineborane} | 0.005 / 0.007 | 219 | 204 | 6.8 | 4.0 |
| 8 | {Phenothiazine / Dimethyl dodecylamine borane} | 0.005 / 0.03 | 118 | 108 | 8.4 | 4.0 |
| 9 | Dimethylamine borane | 0.007 | 5.5 | 4.5 | 8.8 | 4.8 |
| 10 | Dimethyl dodecylamine borane | 0.03 | 5.5 |  | 8.8 | 4.8 |

[1] Concentration in weight percent, based on the weight of polyoxyalkylene compound.
[2] No stabilizer added.

*Example 11*

Following the procedure described for Examples 1 to 10, a sample of the monobutyl ether of polypropylene glycol, having an average molecular weight of about 2,000 was stabilized with 0.005 weight percent of sodium borohydride and 0.005 weight percent of phenothiazine. The stabilized polyoxylalkylene compound was then exposed to the atmosphere at 90° C., under uniform agitation along with a refined but unstabilized sample of the same material. After 20 hours, a 10 weight percent aqueous dispersion of the unstabilized polyoxyalkylene compound had a pH of 5.5, indicating degradation. The stabilized polyoxyalkylene compound took 384 hours to reach the same level of degradation.

*Example 12*

A sample of mixed oxyethylene-oxypropylene polyglycol, having an average molecular weight of about 700 was prepared by condensing 25 parts by weight ethylene oxide and 75 parts by weight propylene oxide with propylene glycol. The polyoxyalkylene glycol was refined and stabilized with 0.005 weight of sodium borohydride and 0.005 weight percent of phenothiazine, as described for Examples 1 to 10. The stabilized polyoxyalkylene compound was exposed to the atmosphere at 90° C. under uniform agitation along with a sample of refined but unstabilized sample of the same polyoxyalkylene compound. After 1.25 hours a 10 weight percent dispersion of the unstabilized polyoxyalkylene compound had a pH of 5.5 whereas 658 hours were required for the stabilized polyoxyalkylene compound to reach the same level of degradation.

*Example 13*

A sample of polyethylene glycol having an average molecular weight of about 400 was stabilized with 0.005 weight percent sodium borohydride and 0.005 weight percent phenothiazine. The stabilized sample was then exposed to the atmosphere at a temperature of 90° C. and under uniform agitation, along with an unstabilized sample of the same material. After 5 hours a 10 weight percent aqueous solution of the unstabilized material had a pH of 5.5 indicating degradation. The stabilized polyethylene glycol took 32 hours to reach the same level of degradation.

*Example 14*

Following the procedure described for Examples 1 to 10, a sample of the monobutyl ether of mixed oxyethylene-oxypropylene glycol, having an average molecular weight of about 4400 was stabilized with 0.005 weight percent sodium borohydride and 0.005 weight percent phenothiazine. The stabilized polyoxyalkylene compound was then exposed to the atmosphere at 90° C., under uniform agitation along with an unstabilized sample of the same material. After 21 hours a 10 weight percent aqueous dispersion of the unstabilized polyoxyalkylene compound had a pH of 5.5. The stabilized polyoxyalkylene compound took 192 hours to reach the same level of degradation.

*Example 15*

A sample of monobutyl ether of a mixed oxyethylene-oxypropylene polyglycol having an average molecular weight of about 700, obtained by condensing equal parts by weight of ethylene oxide and propylene oxide with butanol, was treated in the manner described for Examples 1 to 10 except that neither stabilizer component was added to the polyglycol until after the magnesium silicate had been removed by filtration. Thereupon the polyglycol was stabilized with 0.005 weight percent of phenothiazine and 0.04 weight percent of sodium borohydride. The thus stabilized mixture was then heated to 90° C. and stirred while being exposed to the atmosphere. After 1.5 hours a 10 percent by weight aqueous solution of a control sample containing no stabilizer had a pH of 5.5 whereas 125 hours elasped before a 10 percent by weight aqueous solution of the stabilized mixture had a pH of 5.5.

What is claimed is:

1. A composition which comprises a polyoxyalkylene compound selected from the group consisting essentially of polyoxyethylene compounds, polyoxypropylene compounds and polyoxyalkylene compounds consisting essentially of oxyethylene and oxypropylene units having an average molecular weight between 200 and 50,000, from about 0.005 to about 1.0 weight percent, based on the weight of said polyoxyalkylene compound, of a boron-containing compound selected from the group consisting of alkali metal borohydrides and amine boranes, and from about 0.005 to about 1.0 weight percent, based on the weight of said polyoxyalkylene compound, of a compound selected from the group consisting of phenothiazine and alkylphenothiazine wherein the alkyl group contains from 1 to 8 carbon atoms.

2. A composition as claimed in claim 1 comprising an alkali metal borohydride and phenothiazine.

3. A composition as claimed in claim 2 wherein the alkali metal borohydride is sodium borohydride.

4. A composition as claimed in claim 3 wherein the oxyalkylene units of said polyoxyalkylene compound consist of oxyethylene and oxypropylene units.

5. A composition as claimed in claim 1 comprising an amine borane and phenothiazine.

6. A composition as claimed in claim 5 wherein the oxyalkylene units of said polyoxyalkylene compound consist of oxyethylene and oxypropylene units.

7. The process which comprises mixing a polyoxyalkylene compound selected from the group consisting essentially of polyoxyethylene compounds, polyoxypropylene compounds and polyoxyalkylene compounds consisting essentially of oxyethylene and oxypropylene units containing residual alkaline catalyst, with from about 0.005 to about 1.0 weight percent, based on the weight of polyoxyalkylene compound, of a boron-containing compound selected from the group consisting of alkali metal borohydrides and amine boranes alkali metal borohydride and from about 0.005 to about 1.0 weight percent, based on the weight of polyoxyalkylene compound, of a compound selected from the group consisting of phenothiazine and alkylphenothiazine wherein the alkyl group contains from 1 to 8 carbon atoms and thereafter neutralizing the residual alkaline catalyst.

References Cited

UNITED STATES PATENTS 2,786,080   3/1957   Patton _____ 260—611.5

BERNARD HELFIN, *Primary Examiner.*

LEON ZITVER, *Examiner.*